United States Patent
Manning et al.

(10) Patent No.: US 9,000,334 B1
(45) Date of Patent: Apr. 7, 2015

(54) ELECTROMAGNETIC BOILING LIQUID EXPANDING VAPOR EXPLOSION FUEL VALVE NOZZLE AND INDUCTION HEATER

(76) Inventors: William H. Manning, North Pole, AK (US); James M. Manning, Ester, AK (US); Glenn M Pearson, Fairbanks, AK (US)

(*) Notice: Subject to any disclaimer, the term of this patent is extended or adjusted under 35 U.S.C. 154(b) by 959 days.

(21) Appl. No.: 13/068,020

(22) Filed: Apr. 29, 2011

(51) Int. Cl.
*H05B 6/02* (2006.01)
*B29C 65/00* (2006.01)

(52) U.S. Cl.
CPC ...................................... *B29C 65/00* (2013.01)

(58) Field of Classification Search
USPC ......... 123/549, 294, 295–297, 304, 435, 467, 123/480, 525, 673; 219/482, 494, 129, 636, 219/600
See application file for complete search history.

(56) References Cited

U.S. PATENT DOCUMENTS

2003/0213854 A1* 11/2003 Stickford et al. ............. 237/12.1
2004/0226546 A1* 11/2004 Pellizzari et al. ............. 123/549

* cited by examiner

*Primary Examiner* — Tu B Hoang
*Assistant Examiner* — Phuong Nguyen
(74) *Attorney, Agent, or Firm* — Michael J. Tavella

(57) ABSTRACT

A Bleve (Boiling Liquid Expanding Vapor Explosion) reaction wherein fuel is pumped from a fuel line and is fed through a solenoid valve to a BLEVE reaction chamber. The BLEVE reaction takes place in the bleve chamber, during which a bleve is released and supplied via the bleve outlet nozzle. A thermal housing with embedded electrical resistive wire, is a method and installation for generating sufficient heat causing a bleve. The fuel is heated by the electrical resistive wire as it is moved into the bleve-reaction chamber. As bleved fuel is introduced into the combustion chamber, the latent heat causes the bleve to auto-ignite upon contact with the oxygen producing a blue flame. The cycle of the process is controlled by means of a regulating control. The method described is particularly suited for a bleved fuel valve nozzled burner.

5 Claims, 4 Drawing Sheets

ELECTROMAGNETIC BOILING LIQUID EXPANDING VAPOR EXPLOSION FUEL VALVE NOZZLE AND INDUCTION HEATER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention oil fired burner nozzles, and particularly relates to an electromagnetic induction heater having a bleve reaction chamber.

2. Description of the Prior Art

Conventional nozzle designers and manufacturers have worked to improve the efficiency of their existing designs rather than redesigning nozzles using entirely new technology. Conventional nozzle applications are designed to atomize the fuel, which is not the ideal method to maximize efficiency. Current conventional oil fired burner nozzles are at best 85% efficient, which produces a yellow flame with average temperatures of around 900 degrees Fahrenheit. These burners also produce high CO and other emissions.

BRIEF DESCRIPTION OF THE INVENTION

The instant invention solves these problems. It is a system that incorporates a boiling liquid expanding vapor explosion (bleve) fuel valve nozzle that has an induction heater, which is designed to cause the fuel to undergo a bleve reaction before being released from the outlet nozzle into the combustion chamber. Although the term "bleve" is an acronym for "Boiling Liquid Expanding Vapor Explosion", applicant uses the term herein as a verb to simplify the description. Thus, the use of the term "to bleve" herein means that fuel is undergoing a bleve reaction. Similarly, fuel that has undergone a bleve reaction is considered "bleved fuel".

There, auto-ignition occurs because the bleved fuel carries sufficient latent heat to auto-ignite upon contact with combustion air. This combustion has a flame of over 1190 degrees Fahrenheit (as compared to an average of 900 degrees Fahrenheit for the yellow flame nozzles). Blue flame nozzles, using diesel, bio-diesels, kerosene, or any mixtures thereof are the most efficient burners for the use of fuels while, at the same time, they reduce CO and other emissions.

Generally described, the present invention relates to an electromagnetic bleve fuel valve nozzle and induction heater, comprising a bleve fuel nozzle that has an induction heater in series with a valve, that are used to completely and rapidly bleve fuel passing through the bleve reaction chamber, prior to releasing it into a combustion chamber.

More particularly described, the present invention includes the use of an induction heater, which includes an inner core around which one or more wraps of electrical resistance wire are wound. The inner core contains a bleve reaction chamber, through which the fuel is passed and a solenoid valve, that is used to control the flow of fuel through the nozzle.

Therefore it is an object of the present invention to provide an electromagnetic bleve fuel valve nozzle with an induction heater.

It is a further object of the present invention to provide an electromagnetic bleve fuel valve nozzle that can be used with diesel, bio-diesels, kerosene, or any mixtures thereof.

It is a further object of the present invention to provide an electromagnetic bleve fuel valve nozzle that completely and rapidly vaporizes fuel and causes it to burn efficiently.

It is yet a further object of the present invention to provide an electromagnetic bleve fuel valve nozzle that has long lasting performance features.

Other objects, features, and advantages of the present invention will become apparent upon reading the following detailed description of the embodiment of the invention when taken in conjunction with the drawings.

BRIEF DESCRIPTION OF THE DRAWINGS

FIG. 2b is a top view of the armature used in the solenoid portion of the device taken along the lines 2b-2b of FIG. 2a.

FIG. 3b is a top view of the inlet port and bleve reaction chamber taken along the lines 3b-3b of FIG. 3a.

FIG. 3c is a bottom view of the inlet port and bleve reaction chamber taken along the lines 3b-23b of FIG. 3a.

FIG. 4b is a cross-sectional view of the induction heater taken along the lines 4b-4b of FIG. 4a.

DETAILED DESCRIPTION OF THE INVENTION

As noted above, this electromagnetic bleve fuel valve nozzle rapidly beleves before it is released into combustion chamber of an oil burner. The bleved fuel is imbued with sufficient heat to raise it to its auto-ignition temperature so that it burns upon contact with air. With a throttled air intake this condition creates an oil-fired burner that, because of its hot-throated induction heater, permits the use of diesel, bio-diesels, kerosene, or any mixtures thereof presently used or considered for use. The proximity of the unit's induction heater to the bleve reaction chamber allows complete rapid bleveing of the fuel providing an extremely lean fuel/air mixture, producing an efficient clean burning blue flame burner. The air is throttled such as in the case of an oil-fired burner; the heat output is regulated externally through the electromagnetic bleve fuel valve nozzle and induction heater.

Moreover, when the fuel is in the bleve reaction chamber, it undergoes an explosive, but not catastrophic reaction in that a pressure wave is generated that projects the fuel out of the nozzle into the burner with considerable force.

Figure 1:
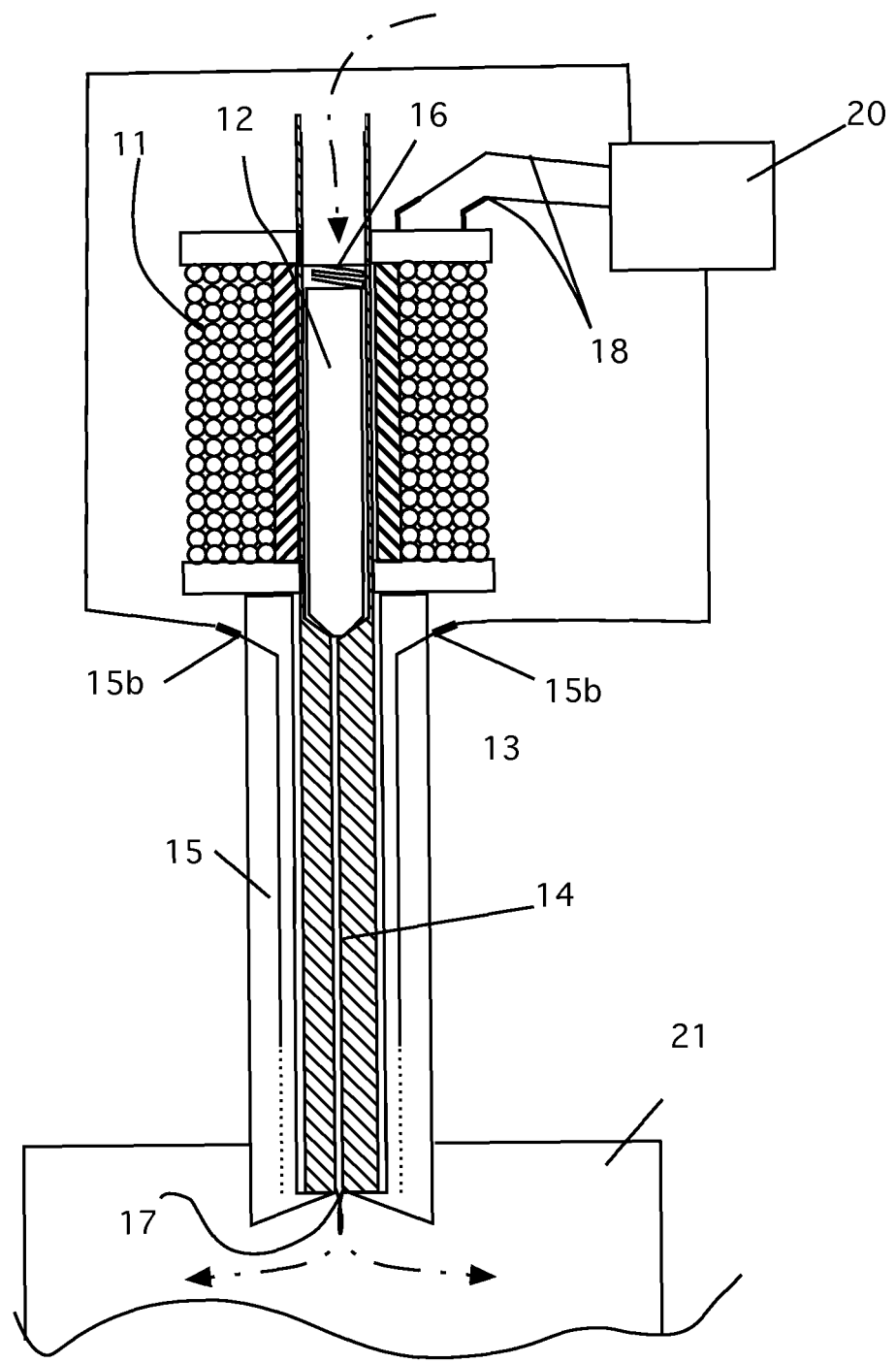
FIG. 1 is a cross-sectional view of a bleve fuel valve nozzle and induction heater unit.

Referring now to FIG. 1, the nozzle 10 has a solenoid coil 11, armature 12 and valve seat 13 that cause fuel (dashed arrow at the top) to be supplied to the bleve reaction chamber 14. An induction heater 15 is installed around the bleve reaction chamber 14. The induction heater 15 is energized for sufficient time to induce sufficient heat into the bleve reaction chamber 14 to cause fuel to bleve and to expand upon exiting the bleve reaction chamber 14. The armature 12 is within stator of the solenoid 11, as shown. The movement of the armature 12 is controlled by the solenoid 11. A spring 16 causes the armature 12 to be pressed against the valve seat 13 when the solenoid is de-energized. When the solenoid is energized through leads 18, the armature 12 rises off the valve seat 13, which releases fuel through the valve seat 13. When the solenoid 11 is electrically de-energized, the armature 12 is returned the valve seat, sealing it. Fuel that has entered into the bleve reaction chamber 14 is heated with the induction heater 15, causing complete rapid bleveing of the fuel. The bleved fuel then exits through the bleve nozzle 17 into the combustion chamber 21. The bleved fuel carries sufficient latent heat to cause auto-ignition when mixed with oxygen when entering the combustion chamber.

FIG. 1 also shows the control system 20, which is considered to be a means for controlling the induction heater and the solenoid valve, that operates the heater and the solenoid. This control system 20 monitors the system and provides electrical voltages to the solenoid and heater leads 15b and 18 as needed. The control system includes programmable electronic controllers and input sensors that are well known in the art.

Figure 2A:
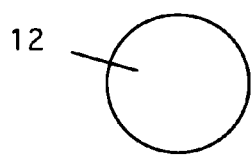
FIG. 2a is a side view of the armature used in the solenoid portion of the device.
Figure 2C:
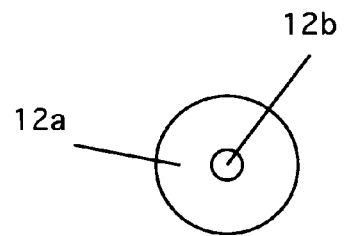
FIG. 2c is a bottom view of the armature used in the solenoid portion of the device taken along the lines 2c-2c of FIG. 2a FIG. 3a is a side view of the inlet port and bleve reaction chamber of the invention.
Figure 2B:
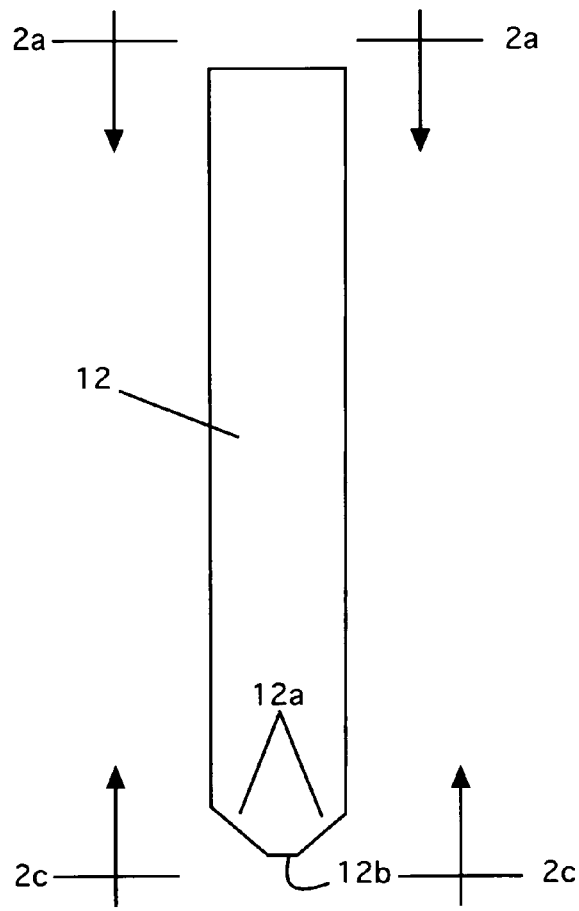

The remaining figures show details of the specific components. FIG. 2a is a side view of the armature 12 used in the solenoid portion of the device. The armature 12 is generally cylindrical (see FIG. 2b) and has a tapered bottom 12a. The bottom portion 12a does not form a sharp point, but rather a flat surface 12b (see FIG. 2c). The bottom portion fits into the valve seat 13, as discussed above.

Figure 3B:
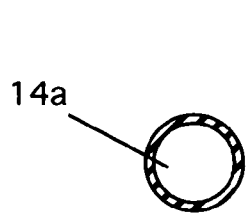
Figure 3C:
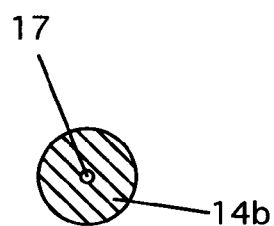
Figure 3A:
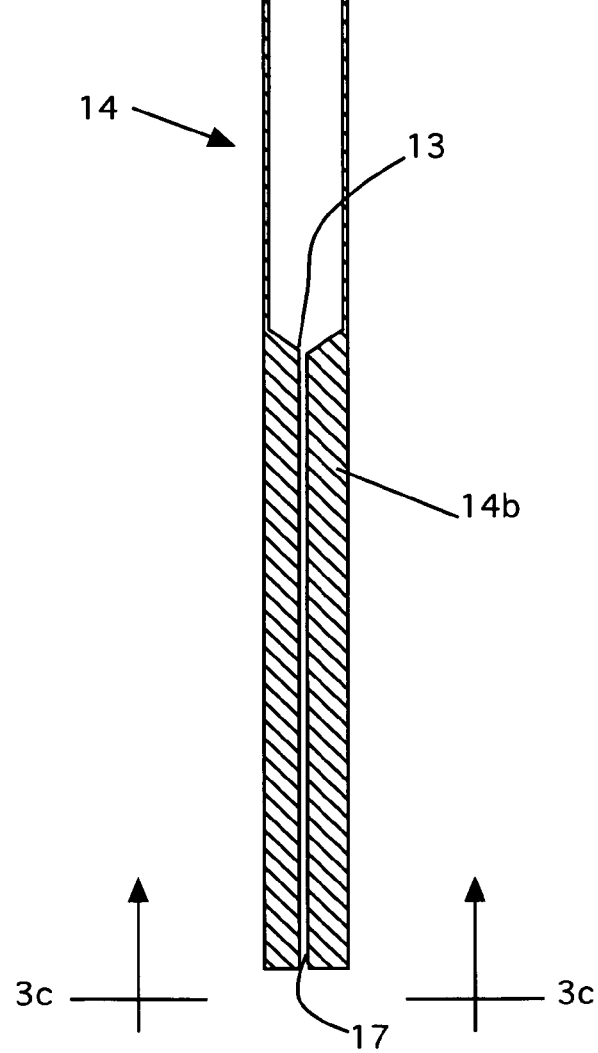

FIG. 3a is a side view of the inlet port and bleve reaction chamber 14 of the invention. At the top of this section is a hollow tube 14a (see also FIG. 3b) into which the armature 12 is placed. Liquid fuel is also inserted onto the chamber through this portion. Fuel enters the top of the hollow tube 14a, where is passes around the armature 12. The valve seat 13 is shown at the bottom of the hollow tube 14a. When the armature is raised by energizing the solenoid 11, the valve seat is open and fuel then has access to the bleve reaction chamber 14b, which is a narrow channel as shown. The outlet of the nozzle 17 is shown at the bottom of the bleve reaction chamber 14b. See also FIG. 3c.

Figure 4B:
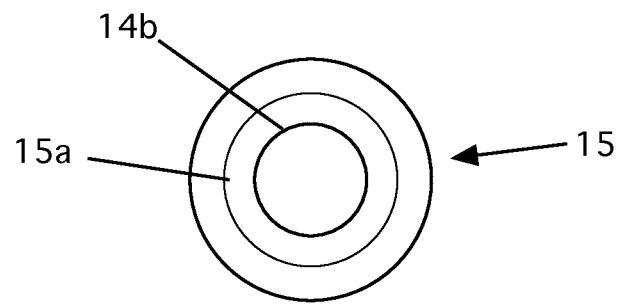
Figure 4A:
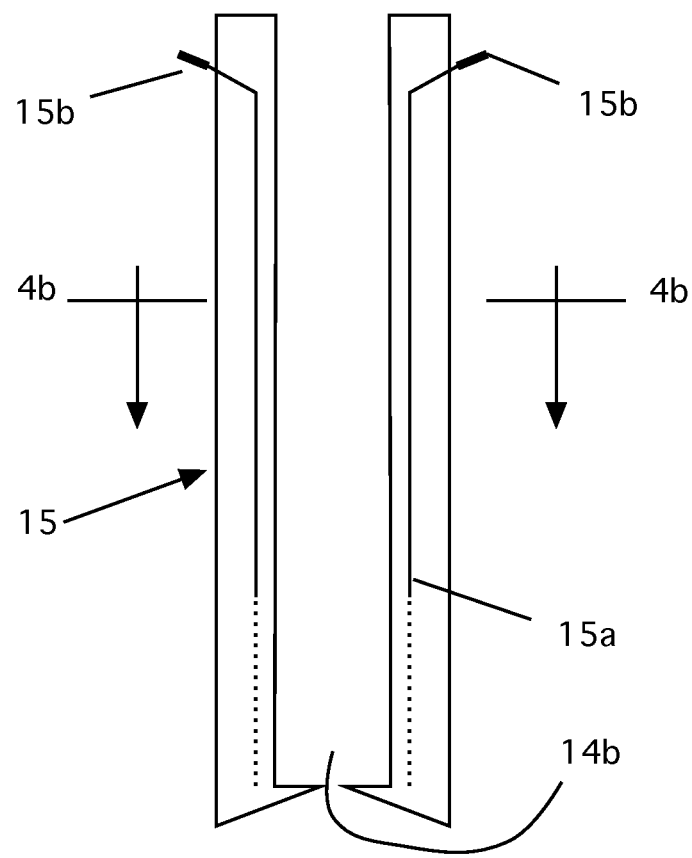
FIG. 4a is a side view of the induction heater for the bleve reaction chamber.

FIG. 4a is a side view of the induction heater for the bleve reaction chamber. The heater 15 consists of a coil of wire 15a that wraps around the bleve reaction chamber 14b as shown (see FIG. 4b). The wires are powered through leads 15b. As current passes through the coil, heat is induced into the bleve reaction chamber. Note that in the preferred embodiment, the coil of wire is embedded in the body of the heater, which is preferably made of a thermally conductive material.

Operation of the Embodiment

In operation, the electronic control unit selects the electromagnetic bleve fuel valve nozzle and induction heater to be used. Voltage is supplied to the induction heater for sufficient time during which complete rapid bleveing of fuels occurs.

The operating voltage is switched on to the valve stator, attracting its armature. The duration is controlled or cycled by external controls, sensors and settings, which determine the quantity of bleved fuel to be released. At the termination of the release the controller switches power to return the stator, disengaging its fuel supply. The armature is not free floating, but is held in place by externally pressurized fuel and the spring. The pressurized fuel forces the valve closed ending a dispensed stream of bleved fuel through the bleve-reaction chamber. The bleved fuel continues on through the bleve-reaction chamber of the unit where auto-ignition occurs in the oxygen rich air of the combustion chamber.

Control

Control of the embodiment may be by programmable electronic controllers and input sensors, or by other means known in the art.

The Material

Conventional resistance material can be used. In the embodiment electrical resistive wire can be embedded in the thermal conductive material.

Miscellaneous

The types of fuels that may be used within the system include diesel, bio-diesels, kerosene, or any mixtures thereof currently considered for use.

General Advantages/Operation

The inventive system creates a clean and lean burning electromagnetic bleve fuel valve nozzle and induction heater system for an oil burner.

With current oil fired burner nozzles, the fuel is released continuously so that it can disperse and ignite fuel in the combustion chamber. In contrast this invention dispenses bleved fuel with sufficient latent heat, auto-igniting as it is being released from a bleve chamber in to an oxygen/fuel mixture rich combustion chamber, much as in the way a jet engine operates.

The use of this device creates an electromagnetic bleve fuel valve nozzle and induction heater modified oil-fired burner. No spark is needed, such as in the case of current oil fired burners.

The air is throttled such as in the case of a typical oil fired burners; the heat output is regulated through the electromagnetic bleve fuel valve nozzle and induction heater, as controlled by the system controller.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. An induction heater apparatus for complete rapid vaporization of fuel comprising:
   a) a bleve-reaction chamber having a body with a length, with a hollow tube therein, said hollow tube running the length of said body on the longitudinal axis of said body, said hollow tube also having an outlet;
   b) an induction heater, wherein said induction heater consists of a coil of wire, the coil of wire is embedded in a housing, which is made of a thermal conductive material, and is positioned about said bleve reaction chamber;
   c) a solenoid valve, positioned on said bleve reaction chamber to control the introduction of fuel into the bleve reaction chamber; and
   d) a combustion chamber for a heating device;
   e) whereby said bleve reaction chamber is positioned such that said outlet of said hollow tube is within said combustion chamber, and further wherein said fuel in said bleve reaction chamber is heated to an auto ignition temperature by said induction heater such that it auto-ignites upon contact with air in said combustion chamber.

2. The induction heater of claim 1 further comprising a means for controlling said induction heater and said solenoid valve, in electrical communication with said solenoid valve and said induction heater.

3. The induction heater of claim 1 wherein the solenoid valve includes:
  a) an armature installed in said apparatus; and
  b) a spring, in operable communication with said armature.

4. The induction heater apparatus of claim 1 wherein said heating device is an oil fired burner.

5. The induction heater apparatus of claim 1 wherein the fuel is selected from the group of: diesel fuel, bio-diesels, and kerosene.

\* \* \* \* \*